United States Patent [19]

Graton et al.

[11] Patent Number: 4,899,862
[45] Date of Patent: Feb. 13, 1990

[54] TORSION DAMPING DEVICE WITH A CENTRING RING MEMBER

[75] Inventors: Michel Graton, Paris; Jacques Alas, Eaubonne, both of France

[73] Assignee: Valeo, Paris, France

[21] Appl. No.: 181,592

[22] Filed: Apr. 14, 1988

[30] Foreign Application Priority Data

Apr. 14, 1987 [FR] France ................................. 87 05295

[51] Int. Cl.$^4$ ............................ F16D 3/14; F16D 3/66
[52] U.S. Cl. ............................... 192/106.2; 192/70.17; 464/68
[58] Field of Search ............... 192/30 V, 70.17, 106.1, 192/106.2; 464/66, 68

[56] References Cited

U.S. PATENT DOCUMENTS

| 4,212,380 | 7/1980 | Billet | 192/106.2 |
| 4,440,283 | 4/1984 | Nioloux | 192/106.2 |
| 4,453,838 | 6/1984 | Loizeau | 384/125 |
| 4,596,535 | 6/1986 | Ooga | 464/68 |
| 4,635,780 | 1/1987 | Wiggen | 192/106.2 |
| 4,643,288 | 2/1987 | Toman et al. | 192/106.2 |
| 4,669,592 | 6/1987 | Alas et al. | 192/106.2 |
| 4,700,821 | 10/1987 | Maucher et al. | 192/106.2 |

FOREIGN PATENT DOCUMENTS

| 2212468 | 10/1973 | Fed. Rep. of Germany . |
| 3248120 | 6/1984 | Fed. Rep. of Germany . |
| 2496786 | 6/1982 | France . |
| 2554886 | 5/1985 | France . |
| 2560329 | 8/1985 | France . |
| 2573830 | 5/1986 | France . |
| 2576985 | 8/1986 | France . |
| 2167527 | 5/1986 | United Kingdom . |

Primary Examiner—Rodney H. Bonck
Assistant Examiner—Richard M. Lorence
Attorney, Agent, or Firm—Charles E. Brown; Charles A. Brown

[57] ABSTRACT

A torsion damper, especially for a friction disc clutch for an automotive vehicle, comprising a hub, a main damper plate, at least one guide ring, and a ring member which is resiliently deformable. The ring member comprises at least one first part which is resiliently deformable and a second part comprising pins for centring with respect to the damping plate.

3 Claims, 3 Drawing Sheets

TORSION DAMPING DEVICE WITH A CENTRING RING MEMBER

BACKGROUND OF THE INVENTION

1. Field of the Invention

The present invention relates to a torsion damping device, especially for a friction disc clutch for an automotive vehicle, comprising at least three coaxial parts mounted in pairs and rotatable with respect to each other within the limits of a predetermined angular displacement and against the biasing action of resilient means, the coaxial parts comprising a first part including a hub, a second part comprising a main damper plate with relative rotational displacement means between it and the hub, and a third part comprising at least one rotatable element which constitutes transversely an annular member surrounding the hub but not coupled with the latter.

2. Description of the Related Art

Such a torsion damping device is described for example in French Patent Application No. 2 560 329 and in French Patent Application No. 2 573 830.

In those constructions there is interposed radially, between the rotatable element (which is commonly referred to as a guide ring) and the hub, a ring member having an internal portion for engagement with the hub, and an external portion for engagement with the rotatable element.

It has already been proposed, for instance, in French Patent Application No. 2 496 786, to provide this ring member with the ability to deform radially so as to avoid parasitic frictional effects which would be capable of masking the action of resilient means of low stiffness.

Such an arrangement allows vibrations to be satisfactorily filtered during the slow running mode, but when in the normal running mode, in which the transmitted torque is not negligible, this solution leads to disadvantages.

In particular, in respect of a damper plate having a facility for relative movement with respect to the hub, this leads to increased wear in the components of the torsion damper, by reason especially of the elasticity of the ring member and of the radial forces which appear during normal running. These wear effects have an effect on the length of life of the clutch.

An object of the present invention is to reduce these disadvantages and thus to provide a ring member capable of minimising wear, while also being radially deformable resiliently so as not to mask the action of resilient means of low stiffness.

SUMMARY OF THE INVENTION

To this end, the invention proposes to provide a ring member of the kind indicated above, characterised in that the ring member comprises at least two parts, of which a first part is resiliently deformable radially, and a second part is relatively rigid with respect to the first part, the second part comprising centring means for centring the ring member with respect to the main damper plate, and being mounted rotatably with respect to the rotatable element.

As a result of the features of the invention, the resilient action of the ring member is preserved during relative movement between the main damper plate and the hub; while, under torque, that is to say after the main damper plate and the hub have been coupled for rotation together, the ring member becomes rigid and reduces wear in the various components, induced particularly by radial movements. In this way, the ring member is of variable rigidity according to whether the resilient means of low or high stiffness is operating.

The second part may be centered directly with respect to the main damper plate. This centring linkage may be in a circumferential sense without clearance, or with clearance to achieve a different mode of interaction with the second part.

For example, the second part may have centring elements engaged, with or without circumferential clearance, in openings in the main damper plate.

Alternatively, the second part may be centered with or without circumferential clearance with respect to a member adapted to be connected for rotation with the main damper plate.

This may for example comprise a friction ring connected for rotation with the main damper plate and centered with respect to the latter by means of tabs, with the addition of a resilient element interposed between the damper plate and the ring to promote friction.

In one embodiment, the second part of the ring member has an external projection for engagement with the guide ring and an internal projection for engagement with the first part of the ring member, separate from the second part and being carried by the hub.

Because of its ability to deform radially, the first part may be engaged in the interior of the second part, and after passing over a shoulder of the second part, it may be blocked against axial movement.

It will be appreciated, contrary to what is stated in French Patent Application No. 2 496 786, that a ring member may be used with resiliently deformable small tongues engaged on the hub.

Under torque, because of its relatively rigid second part, the ring member has well defined characteristics.

DESCRIPTION OF THE PREFERRED EMBODIMENTS

Figure 1:
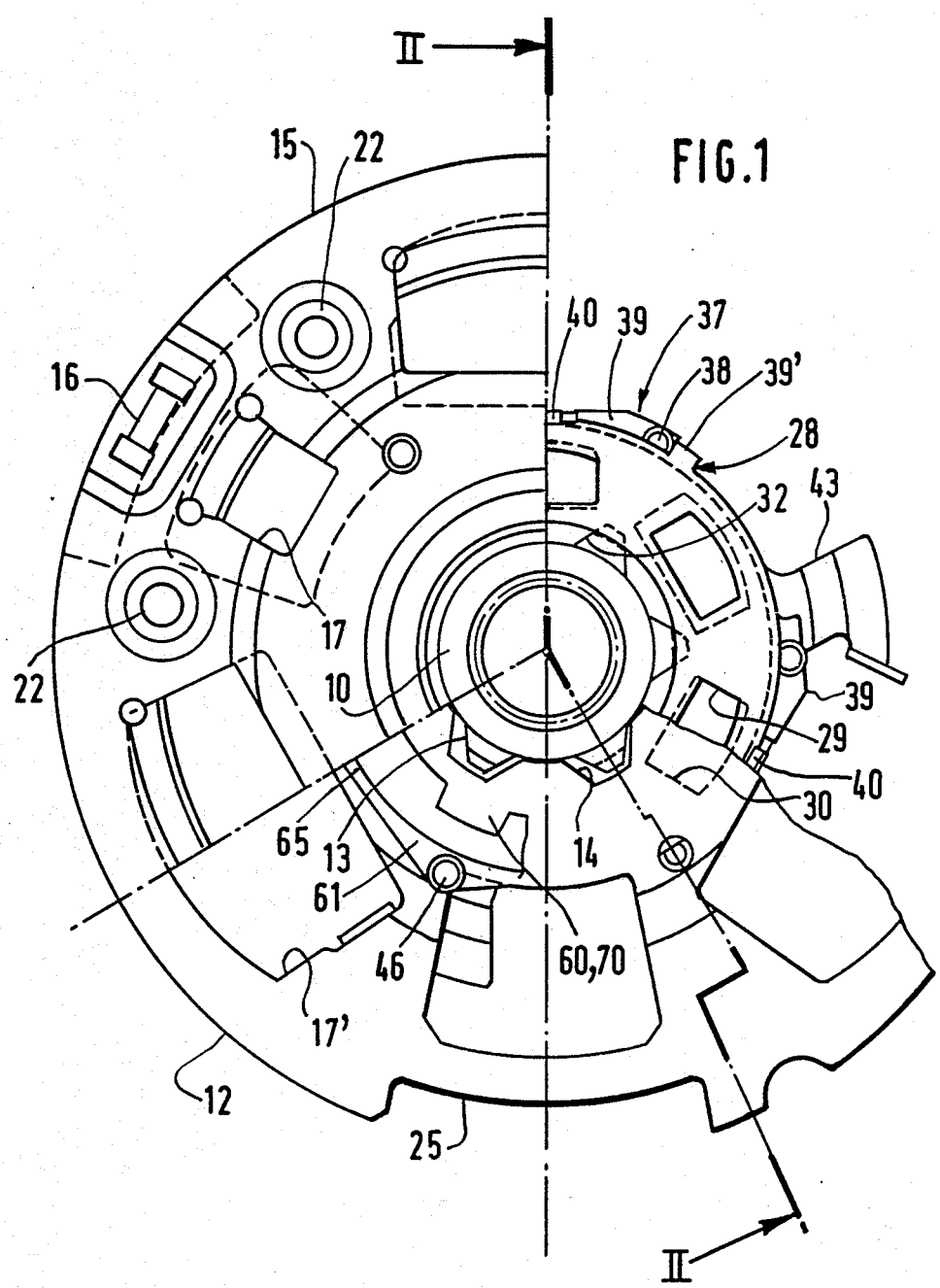
FIG. 1 is a view in elevation, with certain parts locally cut away, of a torsion damping device according to the invention with the friction pads omitted.
Figure 2:
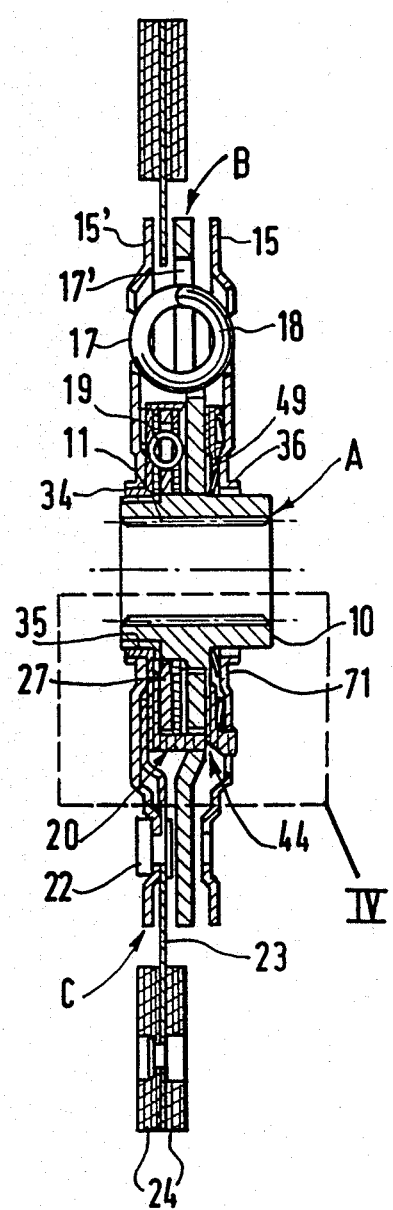
FIG. 2 is a sectional view of this torsion damping device taken on the broken line II—II in FIG. 1.
Figure 4:
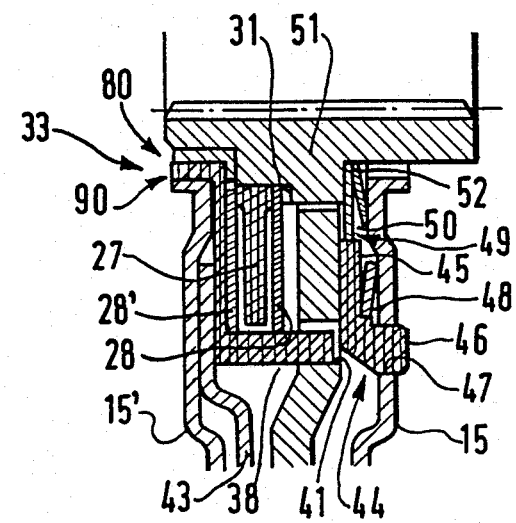
FIG. 4 is a view, on a larger scale, of the part indicated by the broken rectangle IV in FIG. 2.
Figure 3:
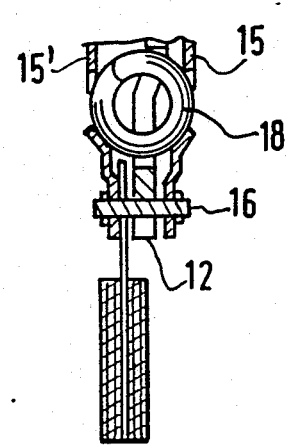
FIG. 3 is a partial axial sectional view showing a spacer arrangement.
Figure 5:
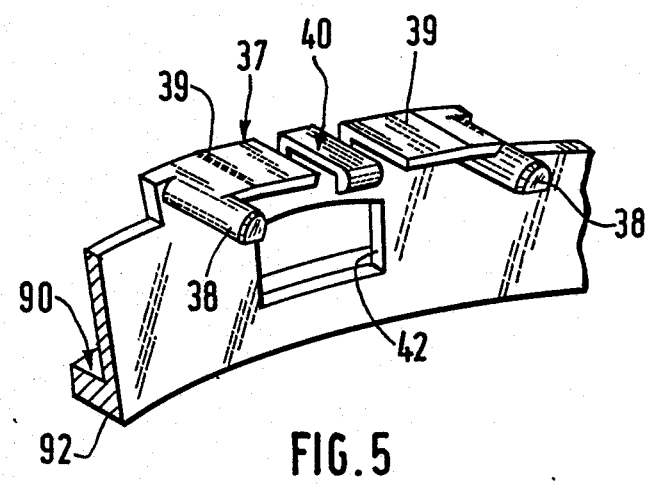
FIG. 5 is a partial perspective view showing the second part of the resilient ring member according to the invention.
Figure 6:
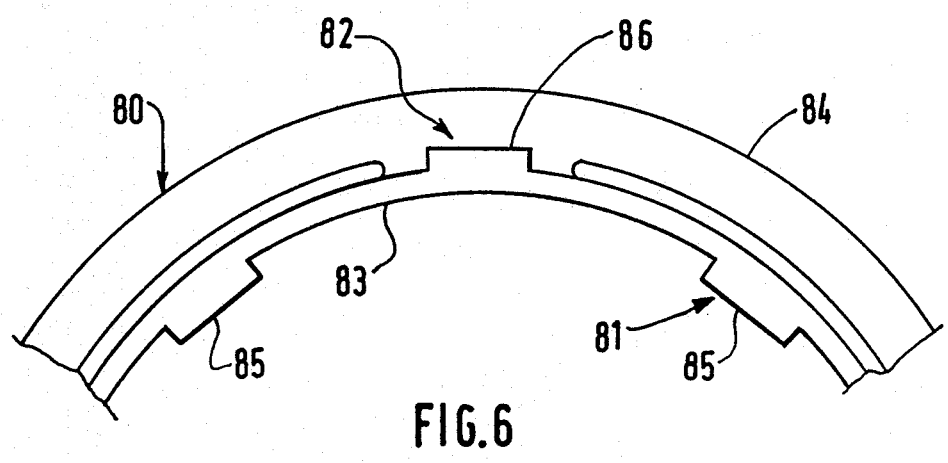
FIG. 6 is a partial elevation of the first part of the resilient ring member according to the invention.

These Figures show by way of example the application of the invention to a friction disc clutch, particularly for an automotive vehicle.

In general, the torsion damping device which forms part of this friction disc clutch comprises three coaxial parts, A, B, C, rotatable with respect to each other within the limits of a predetermined angular displacement and against the biasing action of resilient means.

Part A comprises a hub 10, adapted to be mounted on, and for rotation with, the input shaft of the gearbox of the vehicle concerned, and for this purpose the bore 11 of this hub is splined.

Part B comprises a main damper plate 12, which is an annular member extending entirely transversely and surrounding the hub 10 with, between itself and the hub 10, a relative rotational displacement means.

For this purpose at its thickened outer periphery, the hub 10 has splines or ribs 13 extending radially outwards along part of its length, and in its internal periphery, the main damper plate 12 itself has splines or ribs 14 complementary to the ribs 13, whereby it engages with the ribs 13 of the hub 10 with the prescribed clearance for angular displacement.

Part C comprises at least one rotatable element 15, which, being parallel with the main damper plate 12, constitutes an annular transverse member surrounding the hub, but is not coupled with this hub 10.

The part C in fact has two identical rotatable elements 15, 15', usually referred to as guide rings, which are located axially spaced apart one from the other and parallel to each other, respectively on either side of the plate 12, and which are connected to each other through axial spacers 16 extending through the plate 12, passing through notches formed for this purpose in the latter.

Circumferentially acting resilient means are interposed between the plate 12 and the guide rings 15, 15', which have through openings 17 matching through openings 17' in the plate 12 for accommodating springs 18 which are of the coil spring type.

Similarly, circumferentially acting resilient means 19 are interposed between the plate 12 and the hub 10. The stiffness of the resilient means 19 is lower than that of the resilient means 18. The resilient means 19 are adapted particularly for absorbing vibrations when the engine is in a slow running mode, while the springs 18 are adapted mainly for absorbing vibrations during normal running.

In this example, these resilient means 9 comprising coil springs are incorporated as part of a special torsion pre-damping device 20.

This device 20 is arranged axially between the plate 12 and the guide ring 15'. The guide ring 15' carries, by means of rivets 22, a support disc 23 carrying friction pads 24. By means of these friction pads 24, which are rotatable with the guide rings 15, 15' and which are arranged to be pressed between the reaction plate and the pressure plate of a clutch mechanism (not shown), the torsion damper is adapted to rotate with the crankshaft of the motor car.

This pre-damper 20 comprises a pre-damper plate 27 rotatable with respect to the guide rings 28, 28', which are free with respect to the hub 10 and which are each disposed axially on either side of the plate 27.

The springs 19 are housed, positively without any clearance, in through openings 29 and 30 formed respectively in the guide rings 28, 28' and in the pre-damper plate 27. This plate 27 is made rotatable with the hub 10 by means of the ribs 13 of the latter, which are of reduced radial height beyond a shoulder 31. The pre-damper plate 27 is itself provided with complementary splines or ribs 32, through which it engages without clearance with the portion or reduced radial height of the ribs 13.

An axial ring member 33 is interposed, in a manner to be described below, radially between a cylindrical portion 34 of the hub 10 and a cylindrical portion 35 of the guide ring 15', which is in the form of a portion of the guide ring 15' bent axially outwards.

This ring member 33 is fixed to a spacer ring 37, and rotatable therewith, the ring 37 being provided at its outer periphery with centring pins 38, with axial spacers 39, and with resiliently deformable claws 40. The arrangement is such that the spacer ring 37 extends transversely in a direction opposed to the axial of the assembly.

The pins 38 are cylindrical in form, and are engaged in openings 41 of the main damper plate 12, and the free terminal edge of the spacers 39 is adapted to make contact with the face of the main damper plate 12 facing towards the disc 23, while the resiliently deformable claws 40 are arranged by means of hooks to constitute a sub-assembly with the guide rings 28, 28' and the predamper plate 27 before the predamper is mounted on the ribs 13 of the hub 10. It will be noted that the spacers 39, on the one hand, centre the guide rings 28, 28' and on the other hand, are rotatably connected with the latter through radially extending tabs 39' on the periphery of the guide rings, which engage each spacer 39.

The pre-damper plate 27 is enlarged at its base and constitutes a spacer between the guide rings 28, 28'. The spacer ring 37 being in contact with the face of the guide ring 28' facing in a direction opposed to the plate 27, by means of its resiliently deformable claws 40, it becomes hooked on the other guide ring 28 so as to form a pre-damper sub-assembly. The ring 37 is of course provided with through openings 42 to avoid interference with the springs 19.

It will be noted that a friction ring 43 is axially located between the guide ring 15' and the spacer ring 37.

Between the main damper plate 12, which has a serpentine form to allow space to accommodate the pre-damper 20, and the guide ring 15, there is axially mounted a friction device 44, which is here referred to for convenience as the outer friction device, and which is resiliently deformable.

This outer friction device 44 comprises a internal friction ring 45 and a resilient element 48.

The friction ring 45 is mounted so as to be rotatable with the guide ring 15, and is centred with respect to the latter, for example by means of lugs 46 made rotatable with the guide ring 15 by engagement in complementary holes in the guide ring. The friction ring 45 is adapted to make contact with the main damper plate 12.

The resilient element 48, which in this example is a Belleville washer, acts to load the ring 45 and to create resilient axial pressure between the main damper plate 12 and the various rings.

To be more precise, this washer 48 bears against the guide ring 15 and biasses the friction ring 45 axially towards the main damper plate 12, which has the effect of trapping the ring 43 and the pre-damper 20, which thus entirely constitute an annular spacing means between the guide ring 15' and the main damper 12 due to the spacers 39 bearing on the main damper plate 12.

A further resiliently deformable friction device 49, here referred to for convenience as the inner friction device, is interposed axially between the hub 10 and the guide ring 15.

In greater detail, this device 49 comprises an inner friction ring 50 and a resilient element 52, inserted between the guide ring 15 and the radially enlarged portion which is formed by the ribs 13 at the outer periphery of the hub 10.

This ring 50 is adapted to make contact against the shoulder 51 formed by the transverse face defining the ribs 13. The resilient element 52, which in this example is a Belleville washer, bears on the guide ring 15 and biasses the friction ring 50 towards the damper plate, which also results in the ring 43 and the pre-damper 20 being held between the guide ring 15' and the main damper plate.

In this example, the friction devices 44, 49 are arranged on that side of the torsion damping device which faces towards the clutch mechanism, and this is advantageous, due particularly to the ring 43 and to the pre-damper 20, for the purpose of maintaining good perpendicularity of the disc 23 which carries the clutch friction pads 24. Moreover, the force exerted by the resilient element 48 is greater than the force exerted by the resilient element 52, each of the friction devices 44, 49 being adapted respectively to match the resilient means 18, 19.

It will be noted that the outer friction device 44 is arranged radially inwardly of the spacers 16 and the springs 18. As to the inner friction device 49, this is housed coaxially within the outer friction device 44.

Engagement means 60, 70 are provided between the friction rings of the two friction devices 44, 49 for the purpose of linking the rings in rotation.

In this embodiment, the engagement means 60, 70 comprise at least one radial projection carried by the friction ring 50 and engaging in a complementary recess 70, which is provided on the friction ring 45 at the level of its inner periphery. The reverse arrangement is of course possible.

The projection 60 has a quadrilateral profile with a rounded edge, and forms a radial tab.

In this example, the friction ring 45 is made of plastics material, which is so chosen as to provide both friction qualities and mechanical resistance, as described in the French Patent No. 2 494 795 of 25 Nov. 1980, and may for example be polyamide 6/6 reinforced with glass fibre.

In the embodiment shown, the ring 45 is in an annular form and has, extending radially from its outer periphery, three rounded portions 61 which are arranged circumferentially and spaced apart by 120° with respect to each other.

Each portion 61 has an axially projecting one of the above mentioned lugs 46, of circular profile, mounted in axial engagement in the complementary hole 47 of the guide ring 15.

These portions 61 are connected to each other through a band of annular material 65.

This band 65, through its inner axial face, defines a hollow housing for centring of the Belleville washer 48.

Consequently, the ring 50 has three projections or lugs 60 which engage in three holes 70 formed in the friction ring 45.

As can be seen in the Figure, these holes 70 are disposed radially inwardly of the portions 61 and therefore of the lugs 46.

The friction ring 50 is of metal and its thickness is small, and it lies entirely within the same transverse plane as the ring 45, being radially inwards of the latter.

The resilient element 52, which is of the Belleville washer type, is orientated in the opposite direction to that of the Belleville washer 48, in such a way that it bears through its outer periphery on the guide ring 15, and by its inner periphery on the friction ring 50, in the region of the base of the latter and of the hub 10. In this example, it is the hub 10 itself which centres the said friction ring 50.

It will be appreciated that the crowding of components axially between the guide ring 15 and the shoulder 51 of the hub 10 may be reduced. To this end, the guide ring 15 is provided with a transverse portion 71 on its inner periphery, offset axially towards the main damper plate 12 with respect to the running portion of the latter. It is on this transverse portion that the Belleville washer 52 bears.

Since the guide ring 15 is identical to the guide ring 15', this portion 71 corresponds with the axial flange 36.

In accordance with the invention, the ring member 33 comprises at least two parts or portions 80, 90, namely a first part or portion 80, which is resiliently deformable in a radial direction, and a second part or portion 90, which is relatively rigid by comparison with the first part 80, the second part comprising centering means 38, 41, for centring the ring member with respect to the main damper plate 12, and being rotatably mounted with respect to the guide ring 15'.

In this embodiment, the first part 80 and the second part 90 are separate, and the second part is relatively rigid due to being for example in reinforced moulded plastics material such as polyamide 6/6 reinforced with glass fibre.

This second part 90, extending axially with its outer portion in contact with the axial flange 36 of the guide ring 15' but without being positively fixed to the latter, is integral with the spacer ring 37, and it is the centring pins 38 that centre the second part 90 with respect to the main damper plate 12 and couple them for rotation together.

In this example, the part 90 is flat, and this common rotation takes place without play, while the second part is rotatably mounted with respect to the guide ring 15' in the manner described below.

As can be seen in the Figures, two centring pins 38 are associated with each axial spacer portion 39, which is interrupted in the middle by a gap to accommodate a resiliently deformable claw 40.

These centring pins are disposed at the circumferential terminal edges of a spacer portion 39. In this example, the ring 37 has three spacer portions 39, which are regularly spaced apart circumferentially at 120° with respect to each other, and therefore has three claws 40 and six pins 38. It will be noted that it is the outer portion of the pin 38 that is in contact with the profile of the corresponding opening 41 in the damper plate. In practice, the inner portion of the pin 38 is relieved for contact with the outer peripheral edges of the ring 28 and for centring with respect to the latter.

The inner part 80, which extends axially inside the second part 90, comprises inner projections 81 and outer projections 82, each broken into at least two distinct, projecting, zones of engagement, the projections being formed on a common crown ring which lies entirely offset axially from, and integral with, a spacer ring 84.

The inner zones of engagement 85 extend radially inwards, towards the axis, while the outer zones of engagement 86 extend radially outwards.

The zones of engagement 85 of the inner projection 81 are made so as to be offset circumferentially with respect to the zones of engagement 86 of the outer projection 82.

In this example, the zones of engagement 85, 86 of each inner projection 81 or outer projection 82 are provided in pairs at 120°, and each zone of engagement of one projection is circumferentially equidistant from two zones of engagement of the other of the projections with which it is associated.

As a result of these arrangements, the ring member is able to deform radially, and is preferably so dimensioned that it can be engaged without clearance and with a light force on the hub 10, its ability to deform resiliently making such engagement possible with advantage.

By means of these outer zones of engagement 86, such a first part 80 is fully in contact with the inner bush portion 92 of the ring member 90 and is thereby made relatively rigid.

It will be noted that the spacer ring 84 of the first part 80, after assembly, is inserted axially between the end of the ribs 13 of the main damper plate 12 and the spacer ring 37, in such a way that the first part is immobilised in the axial direction. Furthermore, this ring 84 is slotted circumferentially between two zones of engagement 86 of the inner part 80, so as to allow the latter to be radially deformed. The damping device operates in the following manner:

1. During relative motion between the main damper plate 12 and the hub 10 against the springs 19, the situation is as though the main damper plate 12 were rotatable with the guide rings 15, 15'. To this end, certain of the springs 18 are mounted without clearance in the through openings 17' of the main damper plate 12 and in the corresponding through openings 17 of the guide rings 15, 15', in such a way that having regard to the difference in stiffness between the springs 18 and 19, the guide rings 15, 15' are displace in unison with the main damper plate 12.

During this phase, friction is generated between the shoulder 51 of the hub 10 and the metal friction ring 50, which is connected rotatably with the guide ring 15 by means of its tabs 60, which engage with the opening 70 in the ring 45.

This phase continues until the clearance between the ribs 13 of the hub and the ribs 14 of the damper plate is taken up.

It will be noted that there is a relative movement between the guide rings 28, 28' of the pre-damper, rotatable with the damper plate 12 through the pins 38, and the damper plate 27 of the pre-damper.

Friction is also produced between the said rings 28, 28' and the thickened portion of the pre-damper plate 27; this friction is resiliently induced by a corrugated ring inserted between the shoulder 31 and the guide ring 28.

It will be noted that, during this phase, the second part 90 of the ring member is displaced in unison with the main damper plate 12 and the guide rings 15, 15', and that friction takes place, either between the inner projections 85 of the first part and the portion 34 of the hub 10, or between the projections 86 of the part 80 and the internal bore 92 of the bush 90, the outer portion of the said bush 90 being inactive.

2. After the clearance has been taken up between the ribs 13, 14, the main damper plate 12 becomes solid in rotation with the hub 10, and the springs 19 remain compressed in the state in which they now are. By contrast, the guide rings 15, 15' become movable with respect to the main damper plate 12 as a result of the springs 18 becoming operable. Friction is then generated between the main damper plate 12 and the face 64 of the ring 45 which is connected in rotation to the guide ring 15. It will also be noted that the ring 50 frictionally engages against the shoulder 51 of the hub 10 because of the connection in mutual rotation of the said ring 50 through the ring 45.

Thus, during the second phase it is the outer projection of the second part 90 of the ring member that frictionally engages on the axial portion 36 of the guide ring 15', due to the rotative connection between the main damper plate 12 and the hub 10, and to the rotative connection of the ring member 33 with the main damper plate 12 via the pins 38, which the part is inactive.

As will be evident from the description, the second part 90 is mounted so as to be rotatable with respect to the guide ring 15', or to be more precise its axial flange 36 during the second phase. Moreover, during this second phase, the main damper plate 12 is positioned as much circumferentially as radially with respect to the hub 10. In that connection, reference is once again made to FIG. 1, in which it will be noticed that the ribs 13 and 14 are provided with teeth having a trapezoidal profile in such a way that, through the contact between the oblique flanks of the teeth of the damper plate and of the hub, good radial positioning of the damper plate is obtained. It will be seen that by making the ring member 33 in two parts which are separate from each other, the latter can be made in different materials.

The resilient deformation of the first part 80 may be turned to account in coupling it to the inside of the second part 90, which may have, at the end located most remote from the damper plate 12, a shoulder such that, after passing over the shoulder, the first part becomes unable to move axially between the said shoulder and the radially extended portion of the ribs 13 on the hub 10.

The present invention is of course not limited to the embodiments shown, but embraces all practical variants. In particular, it is applicable to the case in which, as mentioned in French Patent Application No. 2 560 329, the resilient means of low stiffness are disposed in the displacement zone between the hub and the damper plate.

In that case, the spacer ring 37 connected to the ring member 33 has no more than a spacing function.

The first part of the ring member 33 may be integral with its second part, and the second part of the ring member may comprise a portion which is deformable resiliently in a radial direction and which is of greater stiffness than that of the first part. Equally, this first part 80 may be formed of a plurality of resiliently deformable small tongues which are inclined, and the base of which would form the inner projection of the said first part.

Centring of the second part with respect to the damper plate may be carried out in a manner similar to the centring between the rings 50, 45, that is to say that the ring 37 may comprise tabs engaged with or without clearance in apertures in a ring rotatably connected with and centred with respect to the main damper plate. The damper plate 12 may of course have pins 38 engaged in corresponding recesses formed in the ring 37 in its outer periphery.

It will be noted that when the ring member is connected for rotation relative to the damper plate, for example by means of pins engaged in a circumferential opening of oblong shape in the main damper plate, it initially produces friction between the pins and one of the edges of the opening in the damper plate before a frictional effect is produced between the outer projection of the ring member 90 and the axial flange portion of the guide ring 15'. After coupling for mutual rotation has been effected between the main damper plate 12 and the ring member 90, friction in respect of the pins ceases to operate.

When, as in the embodiment shown, the two parts of the ring members are separate, coupling of the two for rotation together may be effected for example with the aid of pins provided on the spacer ring 37 and engaged in apertures in the spacer ring 84 of the first part 80.

Finally it will be noted that the disposition of the friction means 44, 49 through the engaging means 60, 70 fits in well with the ring member 33 according to the present invention, since the action of the inner friction means 44 can be made precise, as the active zone of the ring 56 on the ring 50 can be so placed as to be located in the desired manner very close to the outer periphery of the hub 10, and therefore very close to the ring member 33.

If necessary, the clearance with which the ring 50 and the ring 52 are mounted on the hub 10 may be increased in order to ensure that the ring member is not disturbed.

What is claimed is:

1. A torsion damping device, especially for a disc type friction clutch for an automotive vehicle, said damping device comprising at least three coaxial parts rotatable with respect to each other within the limits of a predetermined sector of angular displacement and against the biassing action of resilient means, said three parts being a first part comprising a hub, a second part comprising a main damper plate with between it and said hub relative rotational displacement means, and a third part comprising at least one rotatable element, which constitutes transversely an annular member surrounding said hub without displacement means, said device further having a resilient ring member radially interposed between said rotatable element and said hub and extending axially; and wherein said ring member comprises at least two separate elements of which a first portion is resiliently deformable radially with an inner portion in contact with said hub, and a second element is relatively rigid with respect to said first element, said second portion comprising centring means for centring said ring member with respect to the main damper plate, and being mounted rotatably with respect to said rotatable element with an outer portion of said second elements being in contact with said rotatable element, and said second element being rigid and being centred with respect to the main damper plate by means of a spacing ring fixed with respect to said second portion element and extending entirely transversely of said hub.

2. A torsion damping device according to claim 1, wherein said spacer ring carries axially extending centring pins engaged in openings in the main damper plate for centring said spacer ring with the main damper plate and for coupling said second element with the main damper plate for rotation together.

3. A device according to claim 1, further including external resiliently deformable friction means, said external friction means comprising a friction ring and a resilient element, said external friction means is interposed between the rotatable element and the main damper plate, while an internal friction means is disposed radially inwardly of said external friction means and comprises a friction ring and a resilient element interposed between the rotatable element and a radial flange of said hub; and wherein engagement means are provided between said internal and external friction means for coupling said internal and external friction rings in rotation.

* * * * *